United States Patent [19]

Dalhof et al.

[11] 4,297,531
[45] Oct. 27, 1981

[54] CIRCUIT FOR SUPPRESSING NOISE INFLUENCES IN THE EVALUATION OF SIGNAL STATES ON TRANSMISSION LINES

[75] Inventors: Axel Dalhof, Puchheim; Robert Lechner, Otterfing, both of Fed. Rep. of Germany

[73] Assignee: Siemens Aktiengesellschaft, Berlin & Munich, Fed. Rep. of Germany

[21] Appl. No.: 83,250

[22] Filed: Oct. 10, 1979

[30] Foreign Application Priority Data

Nov. 24, 1978 [DE] Fed. Rep. of Germany ....... 2850929

[51] Int. Cl.³ .................................................. H04M 3/22
[52] U.S. Cl. .................................. 179/16 AA; 179/1 P; 179/18 FA
[58] Field of Search ............... 179/1 P, 16 A, 16 AA, 179/18 FA, 18 HB, 1 MN, 70, 77; 328/165

[56] References Cited

U.S. PATENT DOCUMENTS

| | | | |
|---|---|---|---|
| 3,202,928 | 8/1965 | Prior | 328/165 |
| 3,611,145 | 10/1971 | O'Connor | 179/1 P |
| 3,622,709 | 11/1971 | Tjaden | 179/18 F |
| 3,808,377 | 4/1974 | Young | 179/18 FA |
| 4,087,646 | 5/1978 | Brolin et al. | 179/18 FA |
| 4,103,112 | 7/1978 | Korsky | 179/18 FA |
| 4,110,569 | 8/1978 | Schindler et al. | 179/18 HB |

FOREIGN PATENT DOCUMENTS 1201093 8/1970 United Kingdom ........... 179/18 FA

Primary Examiner—Bernard Konick
Assistant Examiner—Randall P. Myers
Attorney, Agent, or Firm—Hill, Van Santen, Steadman, Chiara & Simpson

[57] ABSTRACT

A circuit arrangement is provided for suppressing periodic or non-periodic noise voltage components which are superimposed as an undesirable influence on the DC voltage signal to be evaluated on DC fed, two-conductor transmission lines, particularly for extension circuits in telephone systems which are fed in the subscriber circuit of the exchange location via symmetrical branches and evaluated with respect to the subscriber's loop state changes. By coupling to suitable circuit points of the subscriber circuit, the superimposed noise signal is separated by a differential amplifier and fed to a second differential amplifier. The original loop signals, superimposed with noise, is also fed to an input of the second differential amplifier so that a noise-free useful signal indicating the operational state arises at the output of the second differential amplifier.

4 Claims, 1 Drawing Figure

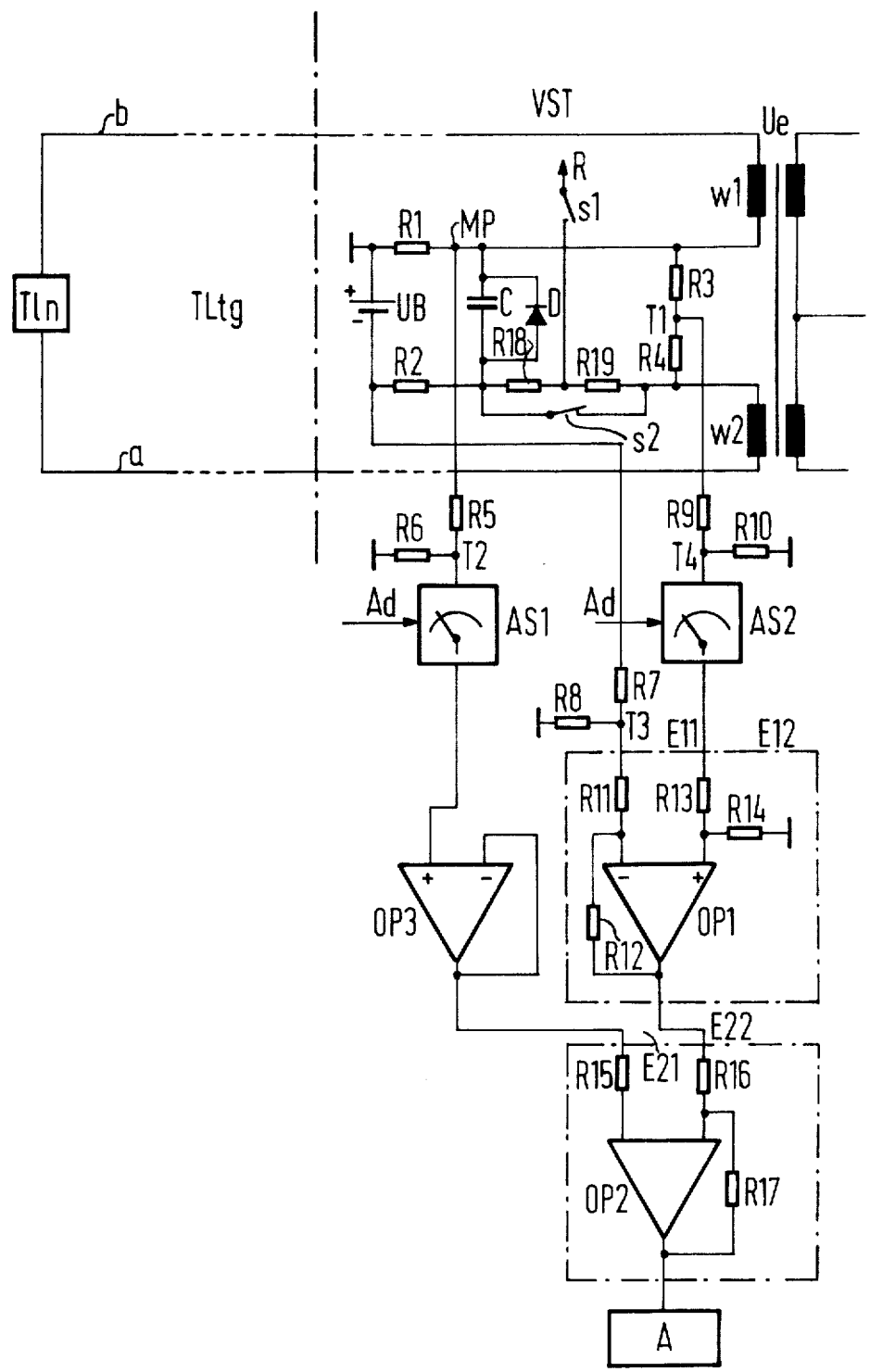

4,297,531

CIRCUIT FOR SUPPRESSING NOISE INFLUENCES IN THE EVALUATION OF SIGNAL STATES ON TRANSMISSION LINES

BACKGROUND OF THE INVENTION

1. Field of the Invention

The present invention relates to a circuit arrangement for suppressing periodic or non-periodic noise voltage components superimposed by means of undesired influence on a DC signal to be evaluated as a line status signal in DC fed, two-lead transmission lines, particularly for the extension circuits in telephone systems fed via symmetrical branches in the subscriber circuit of the switching exchange and to be evaluated with respect to the changes in the status of the subscriber's loop.

2. Description of the Prior Art

For purposes of monitoring, it is necessary to determine the operating state of transmission lines. This is particularly true of extension circuits which carry a maximally allowable discharge current in the idle state and a minimum working current in the working state. The respective DC current value can be determined in the supply circuit assigned to each subscriber extension, since changes of potential which may be evaluated occur in this supply circuit given changes of operational status.

Noise signals can be superimposed on the useful signals to be evaluated, which noise signals, for example, arise due to inductive or capacitive coupling. These periodic or nonperiodic noise voltage components can influence the evaluation device in such a manner that erroneous evaluation results occur. Additional measures must be provided in order to obtain sufficient security against erroneous response.

By employing screening or, respectively, filter arrangements, in addition to a relatively high space requirement, there also occurs the disadvantage that such components can only be designed for a specific frequency or, respectively, for a specific frequency range. Furthermore, a complete elimination of the superimposed noise voltage components is not possible with such components.

SUMMARY OF THE INVENTION

The object of the present invention is to eliminate the superimposed disturbances mentioned above with a simple, frequency-independent structure and to derive a noise-free DC useful signal of proper polarity for the purpose of further evaluation.

The above object is achieved in an arrangement of the type generally mentioned above, according to the present invention, in that, for the rejection of the noise components, one input of a differential amplifier, preferably formed of an integrated operational amplifier, is coupled to the junction of two resistors forming a high-resistance shunt arm between the supply points of the subscriber circuit and the other input is coupled to one pole of the feed source which is uninfluenced by line status. In addition, a suitable input DC voltage amplitude, identical in terms of value, is formed for the DC voltage values which are tapped at these coupling points, the input DC voltage amplitude being formed by means of a fixed divider arrangement connected to each input. Also, the output signal of the differential amplifier, exclusively representing the rejected noise component, is supplied to the one input of a further, identical differential amplifier, whose other input is coupled to a circuit point respectively directly carrying the original DC voltage signal superimposed with a noise voltage, so tht the noise-free useful signal characterizing the line signal state can be tapped at its output.

One then proceeds from a principle which is well known in another context, namely to undertake a separation of the noise components and, for purposes of composition, to directly place these in relationship to the information signal which still contains such noise components. Since the AC resistance of the feed source, for example the office battery, is negligibly small, a reference potential occurs which is free of the noise voltage components coupled in via the line. The other reference values superimposed with the noise voltage is tapped from the junction of the two resistors forming the high-resistance shunt arm which respect to the supply points. Such great resistance values can be selected for these resistors that a disruptive influencing of the overall circuit does not occur. Given identical resistance values, a DC voltage arises at the junction and corresponds in terms of value to half the supply voltage and exhibits the same noise superposition as the voltage, for example, which can be directly tapped at the feed resistance and corresponds in terms of DC voltage to the useful signal.

Independently of the status of the line, therefore, connection points for the separation of the noise components are selected in a differential amplifier, which connection points exhibit a rigidly predetermined DC voltage level. By so doing, they can be brought to a conforming DC voltage value in a simple manner for the drive of the differential amplifier.

According to a further development of the invention, the coupling of the one input of the further differential amplifier supplying the adjacent useful signal in an undisturbed form as its output signal occurs to the circuit point feeding the original DC voltage signal superimposed with a noise voltage upon interconnection of an operational amplifier operated as a voltage follower. Accordingly, identical component units are employed in the total evaluation circuit as active units.

According to a further development of the invention, the device coupled in the manner described to the circuit points can be employed for the evaluation of lines status of a plurality of lines. In this case, the coupling of one and the same device to the respective circuit points is then undertaken via a selection switching element which has the appropriate plurality of steps. By doing so, there occurs a total reduction of expense in use in the subscriber extensions for the suppression of the noise components, as is necessary in the evaluation of line status and undertaken in the device.

BRIEF DESCRIPTION OF THE DRAWING

Other objects, featues and advantages of the invention, its organization, construction and operation will be best understood from the following detailed description, taken in conjunction with the accompanying drawing, on which there is a single figure which is a schematic circuit diagram of an exemplary embodiment of the invention.

Only those elements or, respectively, component units necessary for an understanding of the invention are illustrated on the drawing.

DESCRIPTION OF THE PREFERRED EMBODIMENTS

Referring to the drawing, a subscriber location Tln can be coupled via an extension circuit Tltg via a subscriber connection circuit (not referenced in greater detail) to a switching installation of a switching location VST. Among other things, the subscriber connection circuit serves to transmit the voice signals in both directions and to form a terminating impedance for the line. In this exemplary embodiment, the line termination is formed by means of two windings w1 and w2 of a line transformer Ue. The ends of the two transformer windings which are not connected with respective conductors a or b are capacitively interconnected by a capacitor C. At the same time, these ends form the supply points for the DC feed of the subscriber location extending from the subscriber connection circuit. This DC supply occurs by way of the two feed resistors R1 and R2 which are connected to respective poles of a supply source, for example the exchange battery UB. In addition, the call feed is undertaken via the subscriber connection circuit. To this end, the source supplying the voice frequency signaling current is effectively connected by means of closing a switch s1 and the simultaneous opening of a switch s2 which bridges a pair of resistors R18 and R19 in the idle state, these resistors being connected in series with the resistor R2 and the transformer winding w2. By means of the transformer Ue, among other things, the two-wire system of the extension circuit is converted into a four-wire through-connection so that the transformer Ue functions as a hybrid coupler.

For monitoring purposes, the state of the extension circuit should be determinable in the subscriber connection circuit which, among other things, can execute the functions indicated. This occurs by means of the evaluation of the potential relationships at a measuring point MP. Therefore, the voltage drop at the feed resistor R1 is evaluated. The DC voltage arising, for example, upon loop termination at the feed resistor R1 is superimposed with noise components which can be formed by means of inductive and capacitive couplings. Such a coupling of noise components on the two leads a and b of the extension circuit can, for example, be caused by means of a power line. It is necessary to suppress the influence of such noise components on the device, for example, the device A, which evaluates the operating status of the extension circuit so that a sufficient security against erroneous response is provided. The noise voltage components which are superimposed on the DC voltage at the measuring point MP occur in the same manner at a junction T1 of the two high-resistance shunt resistors R3 and R4. Accordingly, they coincide with the noise components at the measuring point MP with regard to magnitude, phase and frequency. If the same value of resistance is selected for the resistors R3 and R4, then the DC voltage arising at the junction T1 corresponds in terms of value to half the voltage value of the supply source, which is represented, for example, by the exchange battery UB. The negative pole of the battery provides a reference point at which the DC voltage can be tapped disturbance-free, since the battery is to be viewed practically as a shorted circuit for the noise components which have been coupled onto the lines. Accordingly, there is the possibility of separating the noise components occurring at the junction T1, given a constant DC voltage component. This occurs with the aid of an operational amplifier OP1 which is connected as a differential amplifier by means of appropriate reverse feedback. The operational amplifier OP1 is wired in a known manner with a plurality of resistors R11–R14 for the formation of the differential amplifier. A pair of inputs E11 and E12 are formed via a pair of input resistors R11 and R13 and a driven via respective voltage dividers with the noise voltage-free DC voltage tapped from the one pole of the battery or, respectively, with the DC voltage superimposed with the noise voltage, by way of respective voltage dividers formed of a pair of resistors R7 and R8 and, respectively, a pair of resistors R9 and R10. The voltage dividers are selected in such a manner that the DC voltages arising at the divider point T3 or, respectively, the divider point T4 for the two inputs of the differential amplifier are identical in terms of value and are suitable for driving the differential amplifier. Given the precondition of input signals reduced by means of the two dividers and brought to the same DC voltage level, only the noise component arises at the output of the differential amplifier, the noise components being contained in the signal tapped at the junction T1. This exclusive noise component, separated in this manner, is supplied to an input E22 of a further differential amplifier. This differential amplifier is formed by an operational amplifier OP2 and a plurality of resistors R15–R17 connected thereto in a well-known manner. The voltage tapped at the measuring point MP, via the voltage divider formed of the resistors R5 and R6, is supplied to another input E21 of this further differential amplifier via an operational amplifier OP3 which is connected as a voltage follower. Upon consideration of the respective divider ratios, therefore, a signal exclusively proportional to the noise component is supplied to the input E22 and a signal proportional to the useful signal consisting of the DC voltage and the superimposed noise component is supplied to the other input E21. At the output of the operational amplifier OP2 there thus arises a noise-free signal which is proportional to the DC voltage useful signal arising at the measuring point MP. Therefore, the operating status of the respective extension circuit defined by means of specific potential states at the measuring point MP can be registered by means of an evaluation unit A which is connected to the output of the operational amplifier OP2, i.e. with the noise-free signal arising at the output of the differential amplifier.

If the coupling to the respective measuring point MP is undertaken via an appropriately driven selection switching element AS1 and AS2, then a multitude of extension circuits can be polled or monitored as to their operational state with a single component unit serving in the manner described for the suppression of noise components. Thereby, the proper allocation for the evaluation device A to the individual extension circuits must be assured on the basis of a respectively given address Ad. An integrated selector, for example, can be employed as the selection switching element AS1, AS2.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A circuit arrangement for suppressing noise voltage components which are superposed on a DC voltage signal which is to be evaluated as a status signal on a two-wire transmission line which is connectible to and supplied in symmetrical branches at feed points by a DC voltage supply in a subscriber line circuit of an exchange, comprising:

an impedance connected between a first feed point of the DC voltage supply and a connection point coupled to the two-wire line carrying a first DC voltage superposed with noise voltage components; a high-resistance shunt connected across the feed points and including a tap point;

a first differential amplifier including a first input connected to said tap point to receive a second DC voltage superposed with noise voltage components, a second input connected to a second feed point of the DC voltage supply to receive a third DC voltage which is not influenced by noise, and an output providing the noise voltage components;

first and second input means connecting said first and second inputs, respectively, to said tap and the DC voltage supply and operable to provide the third DC voltage equal to the second DC voltage;

a second differential amplifier including a first input connected to said output of said first differential amplifier for receiving the noise voltage components, a second input, and an output; and a voltage follower circuit including an input connected to said connection point to receive the first DC voltage superposed with noise voltage components and an output connected to and feeding said second input of said second differential amplifier so that said second differential amplifier provides a fourth DC voltage proportional to the original supply voltage and representing the state of the subscriber line.

2. The circuit arrangement of claim 1, wherein said first and second input means each comprise:

a voltage divider including a first resistor connected in series with the respective input and a second resistor connected in shunt to the respective input.

3. The circuit arrangement of claim 1, wherein said voltage follower circuit comprises:

an operational amplifier.

4. The circuit arrangement of claim 1, for a plurality of transmission lines each connectible to a respective subscriber circuit which comprises a respective connection point, a respective DC supply point and a respective tap point, and comprising switch means connected to said respective points and to said first and second input means and said input of said voltage follower, and including an address input and operable in response to addresses to selectively connect said transmission lines for monitoring.

* * * * *